United States Patent
Jans

(10) Patent No.: US 10,559,390 B2
(45) Date of Patent: Feb. 11, 2020

(54) ACTIVITY CROSS-CALIBRATION OF UNSEALED RADIONUCLIDES UTILIZING A PORTABLE ION CHAMBER

(71) Applicant: THE GOVERNORS OF THE UNIVERSITY OF ALBERTA, Edmonton (CA)

(72) Inventor: Hans-Sonke Friedrich Jans, Edmonton (CA)

(*) Notice: Subject to any disclaimer, the term of this patent is extended or adjusted under 35 U.S.C. 154(b) by 0 days.

(21) Appl. No.: 16/125,061

(22) Filed: Sep. 7, 2018

(65) Prior Publication Data
US 2019/0074098 A1 Mar. 7, 2019

Related U.S. Application Data

(60) Provisional application No. 62/555,344, filed on Sep. 7, 2017.

(51) Int. Cl.
*G21F 5/018* (2006.01)
*H01J 47/02* (2006.01)
*G01T 1/185* (2006.01)

(52) U.S. Cl.
CPC ............ *G21F 5/018* (2013.01); *G01T 1/185* (2013.01); *H01J 47/022* (2013.01)

(58) Field of Classification Search
CPC ......... G21F 5/018; G01T 1/185; H01J 47/022
See application file for complete search history.

(56) References Cited

U.S. PATENT DOCUMENTS

| 4,631,410 A | * | 12/1986 | Nickles | ..................... G01T 1/20 250/207 |
| 2009/0194677 A1 | | 8/2009 | Allberg | |
| 2009/0283668 A1 | * | 11/2009 | Gilbertson | ............. A61B 6/037 250/252.1 |
| 2019/0038252 A1 | * | 2/2019 | Bhattacharya | ......... A61B 6/037 |

OTHER PUBLICATIONS

L. P. Clarke, R. J. Nordstrom, H. Zhang, P. Tandon, Y. Zhang, G. Redmond, K. Farahani, G. Kelloff, L. Henderson, L. Shankar, J. Deye, J. Capala and P. Jacobs, "The Quantitative Imaging Network: NCI's Historical Perspective and Planned Goals", Transl. Oncol. 7, 1-4 (2014).

National Cancer Institute, "Quantitative Imaging for Evaluation of Responses to Cancer Therapies" http://imaging.cancer.gov/programs_resources/specialized_initiatives/qin/about/default.htm, last accessed on May 26, 2016.

H. Schrader, "Ionization chambers", Metrologia 44, S53-S66 (2007).

(Continued)

*Primary Examiner* — Hugh Maupin
(74) *Attorney, Agent, or Firm* — Bennett Jones LLP

(57) ABSTRACT

A system and method for cross-calibrating a radionuclide at two separate locations (A and B) includes the use of a portable ion chamber configured to fit within a dose calibrator, which ion chamber receives a syringe containing a known volume of a sample of a radionuclide. The portable ion chamber and dose calibrator with the syringe is transported to another location, where a second syringe, identical to the first containing a second sample of the same volume of the same radionuclide is measured in a second dose calibrator.

11 Claims, 6 Drawing Sheets

(56) References Cited

OTHER PUBLICATIONS

American Association of Physics in Medicine, "The selection, use, calibration and quality assurance of radionuclide calibrators used in nuclear medicine", AAPM Report No. 181, Maryland, 2012.

IAEA Technical Report Series No. 454, "Quality Assurance for Radioactivity Measurement in Nuclear Medicine", published by the International Atomic Energy Agency (2006), ISBN: 92-0-105306-1.

R. Gadd, M. Baker, K. S. Nuran, S. Owens, W. Thomson, M. J. Woods and F. Zananiri: "UK National Physical Laboratory Measurement Good Practice Guide No. 93: Protocol for establishing and maintaining the calibration of medical radionuclide calibrators and their quality control" published by the National Physics Laboratory, Middlesex, United Kingdom, (2006), ISSN: 1368-6550.

P. Oropesa, M. J. Woods, V. Olsovcova, and J. A. dos Santos, "Radionuclide calibrator comparisons and quality improvement in nuclear medicine," Appl. Radiat. Isot. 66, 353-361 (2008).

P. A. Oliveira and J. A. M. Santos "Innovative methodology for intercomparison of radionuclide calibrators using short half-life in situ prepared radioactive sources", Med. Phys. 41, 072507-1-8 (2014).

Hans-Sonke Jans, "Activity cross-calibration of unsealed radionuclides utilizing a portable ion chamber", Med. Phys. 43 (12), Dec. 2016, 6536-43.

B. E. Zimmerman and J. T. Cessna "Development of a traceable calibration methodology for solid 68Ge/68Ga sources used as a calibration surrogate for 18F in radionuclide activity calibrators", J. Nucl. Med. 51, 448-53 (2010).

American Association of Physics in Medicine, "Addendum to the AAPM' s TG-51 protocol for clinical reference dosimetry of high-energy photon beams", AAPM Report No. 51 addendum, Med. Phys. 41, 041501-1-20 (2014).

F. Salvat, J. M. Fernandez-Varea and J. Sempau "Penelope 2006: A Code System for Monte Carlo Simulation of Electron and Photon Transport", OECD workshop proceedings (2006), ISBN: 92-64-02301-1.

\* cited by examiner

TITLE: ACTIVITY CROSS-CALIBRATION OF UNSEALED RADIONUCLIDES UTILIZING A PORTABLE ION CHAMBER

FIELD OF THE INVENTION

The present invention relates to a method and apparatus for activity cross-calibration of unsealed radionuclides.

BACKGROUND

The increasing importance of quantitative imaging, for example to assess response to cancer therapies, have brought to the forefront the need to accurately measure the amounts of radioactivity administered to patients. It is therefore commonly recommended that the activity meters, also known as radionuclide calibrators or dose calibrators used in nuclear medicine be calibrated in a traceable, accurate and manufacturer independent manner.

Calibration involves the comparison of a clinical instrument with a reference instrument, for example, at a standards laboratory, and the subsequent adjustment of the clinical instrument based on the outcome of that comparison. This intercomparison can be achieved with relative ease for long-lived sources having sufficient half-life for this purpose, and which may be shipped between centers.

However, the majority of isotopes administered to patients, especially in the important area of positron emission tomography (PET) imaging, are of the short lived variety. Half-lives are measured in minutes and hours rather than weeks or years. Long-lived surrogate sources with decay schemes similar to a clinically used isotope are sometimes utilized for cross calibration, in conjunction with a suitable scaling factor. A notable example is the use of the $^{68}$Ge/$^{68}$Ga surrogate, which has a half life of 270 days, for the clinically important isotope $^{18}$F which has a half-life of 110 minutes.

Using radioactive calibration samples has the obvious disadvantage that repeat measurements are impossible after the decay of the calibration source (e.g. a few weeks in the case of $^{131}$I). Moreover, the need to transport radioactive packages adds layers of administrative cost and complexity (and possibly shipping delays) to the process.

An alternative method for cross-calibration consists in the exchange of suitable instruments, which are calibrated at a location A and then shipped to a location B in order to transfer that calibration. This resembles the methodology utilized in external beam radiation therapy, where reference instruments (ion chamber, electrometer, cable), rather than radiation devices, are shipped and overall cross calibration with uncertainties of about 0.9% can be achieved. When applied to nuclear medicine, such cross-calibration methodology, would, at each location, use the clinically available, locally prepared radionuclides.

One possible approach to implement this strategy would be to ship the dose calibrators themselves between locations, with a replacement instrument available at the clinical site. However, dose calibrators are bulky and their shielded installation make this a cumbersome, expensive procedure. Another approach uses film which is exposed at a first location, where calibration curves are established for a given isotope under reference conditions. The reference conditions are then replicated at a second location, and again a film exposed. The optical densities obtained at the second location are converted into an activity by means of the film calibration curve. However, a large number of decays ($\approx 2\times 10^{13}$) are needed to expose the film, which typically might take 24 hours for $^{99m}$Tc and may be difficult to achieve for shorter-lived sources such as $^{18}$F. Furthermore establishing a calibration curve might take several of such measurements and needs to be repeated for each radioisotope for which calibration is desired. Another disadvantage is that the handling of film would require a low-background environment for the duration of the film calibration, which might not always be the case in a busy nuclear medicine department, and long-term, low-background storage of film stock and the maintenance of film scanners may provide logistical challenges in a nuclear medicine department.

Therefore, there is a need in the art for a method and apparatus for activity cross-calibration of unsealed radionuclides which may mitigate some or all of the disadvantages of the prior art.

SUMMARY OF THE INVENTION

The present invention relates to an ion chamber-based method for the cross-calibration between sites of activity measurements of unsealed radionuclides. The method may allow direct comparison of short lived clinical radioisotopes and the cross-calibration of radionuclide activity meters.

In one aspect, the invention comprises a portable ion chamber adapted to be easily shipped between sites, e.g. between a standards laboratory and a nuclear medicine department. A cylindrical chamber accommodates a syringe filled with unsealed radionuclide. The ion chamber is configured to fit into the well of a dose calibrator, providing low background and staff shielding. In one embodiment, the ion chamber comprises an electrometer and operator interface to interact with the measurement process and obtain measured values.

In another aspect, the invention may comprise a method of cross-calibrating a radionuclide at two separate locations (A and B) comprising the steps of:
  (a) drawing up a known amount of activity, $A_{0A}$, at location A at calibration time $t_{0A}$ into a pre-defined volume in a first syringe;
  (b) inserting the first syringe into a portable ion chamber, and placing the ion chamber into a dose calibrator;
  (c) measuring the chamber's response by integrating charge for a period of time $t_{iA}$ and determining a calibration factor;
  (d) transferring the ion chamber and the first syringe, emptied and cleaned, or an empty second syringe identical to the first syringe, to location B;
  (e) drawing a second sample having the same volume of the same radionuclide into the cleaned and emptied syringe or second syringe, placing the syringe into the ion chamber, placing the ion chamber into a second dose calibrator, and measuring the ion chamber's response in the second dose calibrator for a second period of time;
  (f) determining the activity of the second sample by adjusting with the location A calibration factor, and
  (g) cross-calibrating the second dose calibrator with the first dose calibrator using the measured activity of the second sample.

Preferably, the second syringe is the same make, model and size as the first syringe. The measured activity of the first and second samples may be substantially constant during the first or second periods of time for radionuclides having relatively longer half-lives. Alternatively, in one embodiment, the activity of the second sample is continuously displayed to provide a continuous decay-corrected activity value.

In one embodiment, the ion chamber comprises an electrometer and an associated user interface, which is transferred with the ion chamber to location B. Any embodiment of the method described herein may be computer-implemented using a processor to perform at least the calculation steps of the method.

In another aspect, the invention may comprise a system for cross-calibrating a radionuclide at two separate locations (A and B) comprising:
  (a) a portable ion chamber defining a cavity to receive a first syringe used to draw up a known amount of activity, $A_{0A}$, at location A at calibration time $t_{0A}$ into a pre-defined volume;
  (c) a first dose calibrator defining a cavity to receive the portable ion chamber and a second dose calibrator defining a cavity to receive the portable ion chamber;
  (d) a processor configured to:
    (i) in the first dose calibrator at location A, measure the chamber's response for a first sample volume in the first syringe, by integrating charge for a period of time $t_{iA}$ and determining a calibration factor,
    (ii) measure the ion chamber's response in the second dose calibrator for a second period of time, after the ion chamber and the first syringe has been transferred to location B, and a second sample having the same volume of the same radionuclide into a cleaned and emptied first syringe or second identical syringe, placing the cleaned or second syringe into the ion chamber, placing the ion chamber into a second dose calibrator,
    (iii) determine the activity of the second sample by adjusting with the location A calibration factor; and
    (iv) cross-calibrate the second dose calibrator with the first dose calibrator using the measured activity of the second sample.

DETAILED DESCRIPTION

The present invention relates to a novel method for the cross-calibration of dose calibrators, based on the exchange of a portable ion chamber between sites. In the following description, this method and the ion chamber is described, and measurements and Monte Carlo simulations of an ion chamber are presented. The chamber's sensitivity for the clinically important unsealed radioisotopes $^{99m}$Tc, $^{131}$I and $^{18}$F was measured and compared to Monte Carlo calculations. The influence of syringe fill volume, positioning and construction (wall diameter, length) was also investigated using Monte Carlo simulations. The chamber's linearity was measured over 5.5 orders of magnitude and it's constancy tested over a period of >14.5 months. An overall uncertainty budget is presented.

Measured chamber sensitivity was 12.1, 12.5 and 29.4 pA/100 MBq for $^{131}$I, $^{99m}$Tc and $^{18}$F, respectively. The uncertainty budget for the ion chamber alone yields an overall uncertainty of better than 1%, with the greatest contribution arising from constancy and linearity (0.5% each). Strategies to further reduce uncertainties are discussed.

Figure 1:
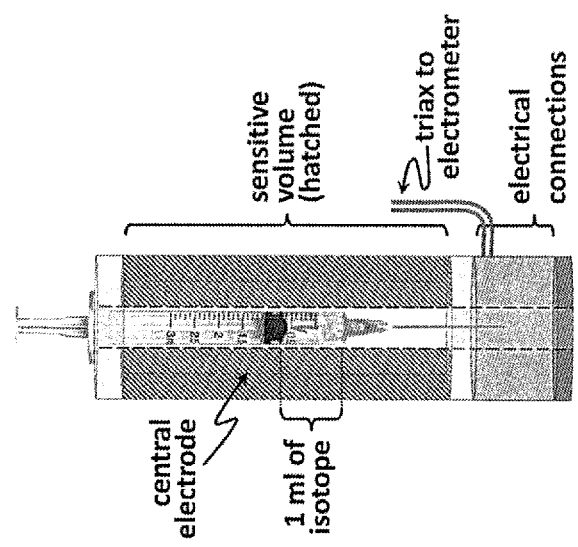
FIG. 1 shows a schematic cross-sectional view of one embodiment of an ion chamber with inserted 3 ml syringe.

In one embodiment, the portable ion chamber is cylindrical in shape. A hole along the long axis of the ion chamber allows insertion of a syringe. The diameter of the central hole may be chosen to accommodate a typical 3 ml syringe (FIG. 1). The height of the chamber is determined by the requirement to hold a 1 ml volume of radioisotope—drawn up into the syringe—in the center of its sensitive volume. This design minimizes variation of the chamber's response to the depth of syringe insertion. If present, a needle attached to the syringe can protrude through the bottom of the central hole. Design characteristics of one embodiment of the ion chamber are summarized in Table 1.

TABLE 1

Design characteristics of one example of an ion chamber

| | |
|---|---|
| Outer diameter | 41 mm |
| Inner diameter (bore) | 13 mm |
| Height of chamber | 110 mm |
| Sensitive volume | 89.4 cm$^3$ |
| Weight | 0.62 kg |
| Fill gas | air |
| Gas pressure | ambient air pressure |

Figure 2:
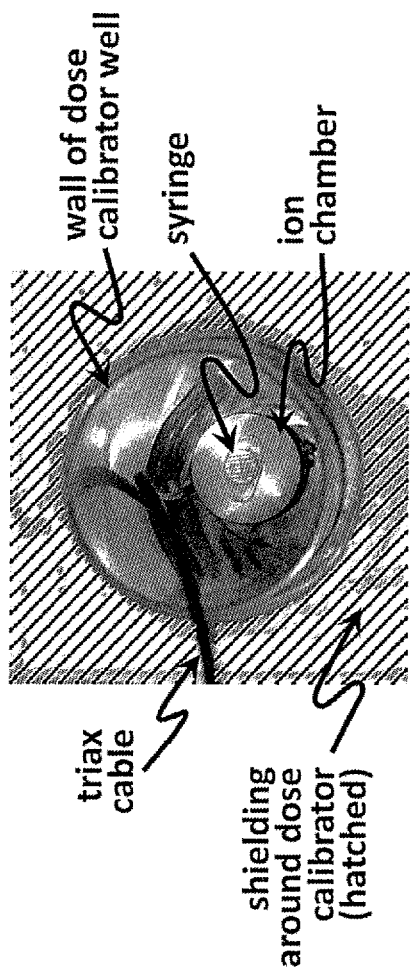
FIG. 2 shows a top plan view into the well of a dose calibrator, the calibration ion chamber rests on the bottom of the well.

The ion chamber's outer diameter is small enough for the chamber to be lowered into the (uncontaminated) well of a conventional dose calibrator (FIG. 2). The need to envelop the chamber in its own (heavy) shielding material is thus eliminated: the dose calibrator's shielding reduces background to the ion chamber and protects the operator to the same degree as the dose calibrator would when in operation.

The ion chamber walls are made of any conducting material, such as copper. The outer and inner walls of the ion chamber are held on electric ground potential. High voltage is applied to the cylindrical central electrode to facilitate charge collection. To reduce leakage current, the top and bottom ends of the central cylinder are preferably surrounded by insulation and guard electrodes. Electrical connections are housed at the bottom of the assembly in order maximize depth of syringe insertion into the sensitive volume from the top.

In one embodiment, the ion chamber is designed to communicate with ambient air, which may necessitate temperature and pressure corrections to its readings. In alternative embodiments, the chamber may be sealed, which would eliminate the need for this correction.

The syringe may be of any size and material, but should be constant. In one embodiment, a 3 ml syringe may be used because its diameter is large enough to allow easy handling (e.g. to expel air bubbles) while permitting the chamber to be constructed with a narrow inner hole, thus maximizing the chamber's sensitive volume. Furthermore, this syringe size is commonly available in a Nuclear Medicine department and since specific activities of several 100 MBq/ml are frequently used in Nuclear Medicine, activities handled during the calibration process are not uncommon. A 1 ml radioisotope sample, once its activity values has been established, can of course be dispensed from the 3 ml syringe into syringes or vials of other form factors or material compositions in order to obtain accurate calibration for those containers, if desired.

In one embodiment, the ion chamber comprises an interface with suitably designed software or firmware in order to operate and read out an associated electrometer and display decay corrected activity values even after the sample (syringe) has been removed from the ion chamber. In one embodiment, the electrometer also includes a user interface or could connect to a user interface which may provide elements such as display of decaying activity even after the sample has been removed from the ion chamber. The software may provide data entry and display functions, as well as perform the necessary calculations and other method steps described herein.

Operation

When transferring a calibration from location A to B, a known amount of activity, $A_{0A}$, is drawn up at location A (e.g. a standards laboratory) at calibration time $t_{0A}$ into a pre-defined volume, for example 1 ml, and the syringe inserted into the ion chamber after replacing the needle with a clean one or otherwise capping the syringe. For radiation protection purposes and to shield it against background radiation, the ion chamber is placed in the uncontaminated well of an existing dose calibrator (FIG. 2). The chamber's response is then measured by integrating charge for a suitable amount of time $t_{iA}$, e.g. 60 seconds, starting at time $t_{1A}$ and leading to a raw reading of charge $R_A$. The number of decays $N_A$ during the time $t_{iA}$ is:

$$N_A = A_{1A} \cdot (1 - \exp(-\lambda \cdot t_{iA})) \quad (1)$$

where $\lambda$ is the decay constant of the isotope in question and $$A_{1A} = \frac{A_{0A}}{\lambda} \cdot \exp(-\lambda(t_{1A} - t_{0A}))$$

is the activity contained in the syringe at the start of the integration (charge collection). Since the chamber was open to the atmosphere, a correction $P_{TpA}$ for atmospheric pressure and temperature is applied to the $R_A$, and a calibration factor f in units of $$\left[\frac{\text{charge}}{\text{decay}}\right]$$

established:

$$f = \frac{R_A \cdot R_{TpA}}{N_A} \quad (2)$$

The chamber, together with the electrometer used to obtain $R_A$ and an empty second syringe, one of the same size, make and model as the first syringe, is then shipped to location B. At location B, 1 ml of the same isotope is dawn up from the local stock and measured in the calibration chamber which is again placed inside the well of a dose calibrator at location B. A reading $R_B$ is obtained, starting at $t_{0B}$, by again integrating charge for a time $t_{iB}$ and correcting for atmospheric pressure and temperature at location B. The total number of decays $N_B$ occurring during the measurement interval is found by means of the calibration factor f established at location A:

$$N_B = \frac{R_B \cdot P_{TpB}}{f} \quad (3)$$

from which the activity $A_{1B}$ contained in the sample at time $t_{1B}$ is determined:

$$A_{1B} = \frac{N_B \cdot \lambda}{1 - \exp(-\lambda \cdot t_{iB})} = \frac{R_B \cdot P_{TpB} \cdot \lambda}{f \cdot (1 - \exp(-\lambda \cdot t_{iB}))} \quad (4)$$

The activity contained in the first syringe is now known. It can be taken out of the calibration ion chamber and inserted into the dose calibrator at location B, giving a reading time $t_{0B}$. Calibration of this dose calibrator then consists in adjusting its reading (by varying its internal settings for the isotope in question) to the value:

$$A_{0B} = A_B(t_{0B}) = A_{1B} \cdot \exp(-\lambda(t_{0B} - t_{1B})) \quad (5)$$

The instrument at location B is now cross-calibrated with the one at location A (or the calibration could just be checked by comparing the reading with $A_{0B}$). This procedure is feasible if $A_{0B}$ is essentially constant during the time it takes to adjust the reading of the dose calibrator at location B. If the half life of the radioisotope in question is short, the continuing decrease of activity contained in the syringe will impact the calibration. Once the activity in the second sample has been determined, using the ion chamber, that sample now has to be handled, which takes time to be removed from the ion chamber and inserted in the dose calibrator and the dose calibrator's reading adjusted to be equal to the activity of the second sample. The second sample's activity will now have changed (decreased) and is unknown.

Accordingly, a computerized implementation of the calculations—for example on a portable electronic device communicatively coupled with the electrometer—could display a continuously decay-corrected activity value once $A_{1B}$ is obtained. The ion chamber's user interface can make that activity known by continuously displaying the sample's activity value, updated for radioactive decay of the sample, from the time the activity has first been measured, continuing on after the sample has been removed from the ion chamber and is inserted in to the dose calibrator etc. In a preferred embodiment, this computerized implementation would be included in the software operating the electrometer. In addition, the computerized implementation would facilitate obtaining properly time-stamped readings, implementing equations 1 through 7, selecting half lives from a bank of stored radioisotopes, obtaining background readings and applying corrections, adjusting the measurement time $t_i$ as needed, storing calibration values obtained at location A (to be applied at location B), accounting for residuals (if contents of the 3 ml syringe is dispensed into other containers at location B).

Embodiments of the invention may allow cross calibration of dose calibrators in two different locations, without the need for surrogate sources or shipment of radioisotopes. Analysis of ion chamber related uncertainties associated with one embodiment led to an overall uncertainty of less than 1%.

The largest sources of error originated from the leakage current (0.4%), linearity (0.5%) and long-term stability (0.5%). Without restriction to a theory, the relatively large leakage current might be due to the substantial contact surface of the central cylinder electrode with its insulator along the circumference at the cylinder's ends. Therefore, in a preferred embodiment, the electrical design of the ion chamber may be adapted to reduce this contact surface and thickening the insulator should reduce the leakage and the uncertainty it contributes to the measured chamber sensitivity. Long-term stability can be improved by either reducing the uncertainty of temperature and pressure values or by utilized a sealed ion chamber design. Therefore, in a preferred embodiment, the ion chamber may be sealed, and a suitably pressurized gas introduced into the ion chamber volume. This may also increase the chamber's sensitivity.

The contribution of linearity to the overall uncertainty can be reduced by the operator at location B resorting to merely keeping the current $I_B$ within a factor 2 of the current $I_A$. Because the fitted curve rises with the power of 0.00657 (FIG. 9), this means that the readings at locations A and B deviate by less than 0.5%. This method avoids performing explicit corrections to the sensitivity determined at location A using equation (6).

In one embodiment, uncertainties resulting from electronic noise and the Poisson nature of radioactive decay may be rendered insignificant by keeping the chamber current above about ≈1 pA.

The uncertainty caused by varying syringe design and fill volume is relatively small. The chief uncertainty results from an inaccurate amount of isotope drawn up into the syringe. Overfilling by 20% (0.2 ml) yields a calibration error of 0.4%. Under filling the syringe by the same amount will only introduce an error of 0.16%. These values compare favorably to the accuracy required in prior art methods, where a syringe fill error of only 5% (0.05 ml) already introduced an error of 1.6% (netOD). To minimize the syringe fill error, in one embodiment, the recommendation procedure would be to err by under fill, as opposed to overfilling. In another embodiment, the ion chamber may be adapted such that it's center along the central axis coincides with its empirically determined maximum sensitivity (see for example, FIG. 5 below). This in turn would compromise the optimal design with regards syringe length variation (FIG. 4), so that an optimization analysis based on both parameters and their respective uncertainties could be carried out.

Sources of error that are not ion chamber related may also contribute to the cross calibration. It was found, for example, that changing the electrometer's measurement range can alter the measured value by 0.08% and individual instruments will slightly vary in their response. In one embodiment, the electrometer and cable should also be shipped between sites and measurement range kept consistent. The measurement error occurring at the first location (which would be the same for any method of calibration) also has to be added to the uncertainty budget in case of absolute calibration.

Preferably, the ion chamber would itself need to undergo regular quality control. The most important property to verify is the chamber's sensitivity. This could be achieved by placing in regular time intervals (e.g. every few months) a long-lived check source in the chamber's center, positioned reproducibly by means of a suitably designed source holder. The sensitivity (in pA/100 MBq) should then remain constant over time.

A preferred method described here, i.e. measuring background, accounting for sensitivity variations, temperature and pressure corrections, continuous display of decay corrected activity during the calibration process (1% of $^{99m}$Tc, for example, decays every 5 minutes) and accounting for residuals can yield to a relatively complex workflow. Therefore, in a preferred embodiment, the cross calibration process may be computerized.

Embodiments of the present invention may be extended to a range of unsealed sources available today for clinical, pre-clinical and laboratory investigations. It is limited only by the need to create sufficient ionization current. For example, solely or predominantly beta-emitting isotopes used for molecular radio therapy (e.g. Y-90, Lu-177 etc.) may produce sufficient bremsstrahlung radiation to allow use of the ion chamber and method described here.

Certain exemplary specifics of the chamber design described herein need not limit the breadth of the claimed invention. For example, the 3 ml syringe size or the 1 ml fill volume used in the examples below were chosen arbitrarily. The chamber design may be modified and optimized to accommodate other syringe and fill volumes if so desired. An upper limit for the ion chamber's dimensions is given by the dimensions of the dose calibrator's well. The ion chamber needs to be small enough to be lowered into the well of a dose calibrator in order to a) reduce background radiation and b) protect the operator. This key feature eliminates the need to shield the calibration ion chamber itself, enabling it to be light weight and easily shipped between sites. Ideally each site would be cross-calibrated to a standards laboratory. But the concept described here also provides a reliable method for cross calibration among sites, which would be useful if, for example, several clinical sites are collaborating in a quantitative multi-center trial.

Examples—The following examples are intended only to illustrate or assist in understanding specific embodiments of the claimed invention.

Simulations and measurements—Sensitivity

The sensitivity of the calibration ion chamber, expressed in ionization current measured per activity contained in the ion chamber in units pA/100 MBq, is determined for four isotopes ($^{57}$Co, $^{18}$F, $^{131}$I and $^{99m}$Tc) using measurements and simulations. For each, a 3 ml syringe, containing 1 cm of radioisotope was used and measured in a commercial dose calibrator (Capintec, CRC-55T), except for $^{57}$Co where a commercial point source with a nominal activity of 185 MBq was utilized (Eckhard and Ziegler, USM02).

Measurements were carried out with an ion chamber as described and illustrated above, and a commercial electrometer (UnidosE, PTW, Freiburg, Germany). Current readings were obtained by integrating charge and dividing by the acquisition time (typically 60 seconds).

For simulations, models of the ion chamber and sources were created in the Monte Carlo framework Penelope.[12] On the order of $10^{11}$ histories were collected in each simulation, enabled in part by support provided by WestGrid (www-.westgrid.ca) and Compute Canada Calcul Canada (www-.coumptecanadaca).

Preferably, the syringe used to draw up activity is shipped with the calibration ion chamber between sites, eliminating any dependence of the cross calibration on syringe manufacturing tolerances. However, the measurements obtained will still depend on the operator error regarding the amount of isotope drawn up. This dependence was quantified by varying the syringe's fill volume in Monte Carlo simulations.

If for some reason the syringe used at location A cannot be shipped to location B, the same model of syringe should be used at location B. In that case, additional sources of error include manufacturing tolerances for the syringe. To quantify this source of error, the effect of varying syringe length and wall thickness was also investigated using Monte Carlo simulations.

Values for sensitivity are listed in Table 2. Simulated and measured values agree very well for $^{57}$Co and within 7% for $^{99m}$Tc and $^{18}$F. The greatest discrepancy (14%) is observed for $^{131}$I. Exact agreement cannot be expected because, except for $^{57}$Co, the measured sensitivities rely on activity values that themselves has been determined using a dose calibrator—the very instrument for whose calibration the ion chamber described here is designed. A true measured sensitivity value could be established at a standards laboratory, where a radioisotope sample with accurately known activity would be used for this purpose. The ion chamber described here is designed to facilitate exact comparison, i.e. relative readings of activity (e.g. between a standards laboratory and a clinical site, or between clinical sites). Therefore, sensitivity is reported here relative to a suitable reference value.

TABLE 2

Monte-Carlo simulated and measured values for sensitivity

| Isotope | Simulated pA/100 MBq | Measured [a] pA/100 MBq | Ratio meas./simul. |
|---|---|---|---|
| $^{57}$Co | 15.20 | 15.3 | 1.01 |
| $^{99m}$Tc | 13.46 | 12.5 | 0.93 |
| $^{131}$I | 14.04 | 12.1 | 0.86 |
| $^{18}$F | 31.18 | 29.4 | 0.94 |

[a] except for $^{57}$Co, where the nominal source activity is quoted

Figure 3:
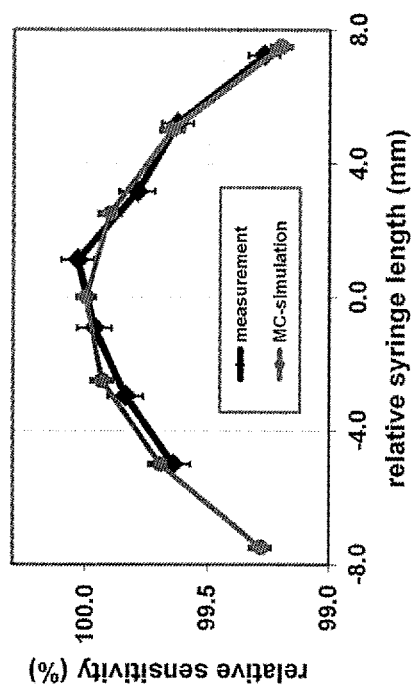
FIG. 3 shows a graph comparing measured and simulated values for the change of sensitivity to a change of syringe length (i.e. depth of insertion of the radioisotope sample) for the isotope $^{99m}$Tc.

Starting from the baseline sensitivities in Table 2, Monte Carlo simulations were further carried out to determine how varying syringe length, which would result in a change of the radioisotope's insertion depth into the ion chamber, affect the chamber's sensitivity. This variation in syringe length might be caused by manufacturing tolerances and contribute to an overall calibration error. The simulated values were compared with measured ones, using 1 ml of $^{99m}$Tc contained in a 3 ml syringe, and are shown in FIG. 3. Measured and simulated sensitivity values match well within experimental error. Importantly, changing the syringe length by a relatively large value of 5 mm lowers the chamber's sensitivity by only ≈0.3%, meaning that the chamber design is insensitive with regards to manufacturing tolerances of this parameter.

Figure 4:
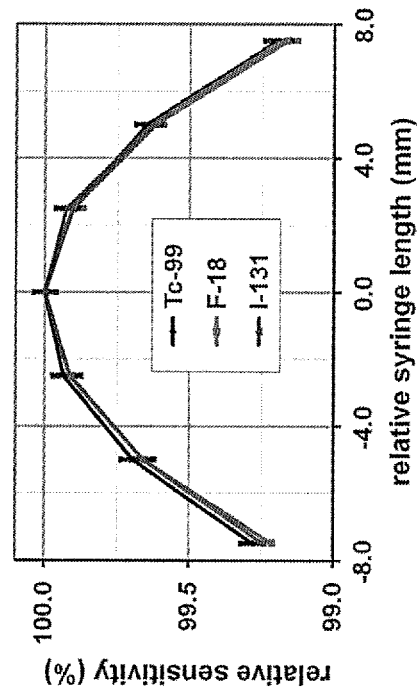
FIG. 4 shows a graph showing relative ion chamber sensitivity as a function of variation of syringe length from its nominal value at the center of the sensitive volume of the ion chamber. Monte Carlo simulations for the isotopes $^{99m}$Tc, $^{18}$F and $^{131}$I.

The simulations were carried in an analogous manner for the radioisotopes $^{131}$I and $^{18}$F and results of those simulations are shown in FIG. 4 together with $^{99m}$Tc. Relative sensitivity changes in a very similar manner for all isotopes simulated when the syringe length varies from its nominal value.

Figure 5:
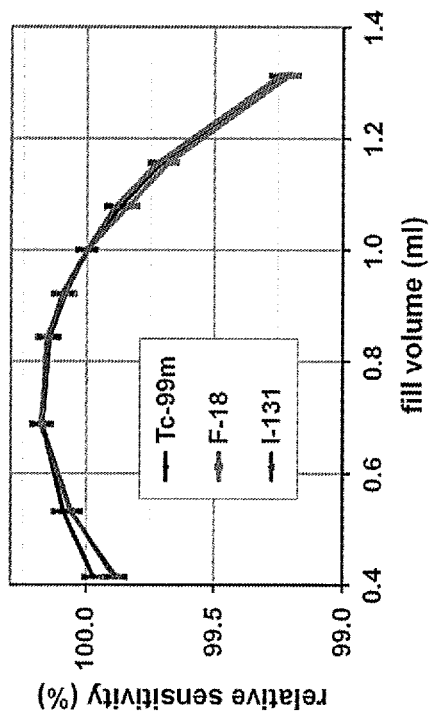
FIG. 5 shows a graph showing relative ion chamber sensitivity as a function of syringe fill volume (nominal value was chosen to be 1 ml). Monte Carlo simulations for the isotopes $^{99m}$Tc, $^{18}$F and $^{131}$I.

Further Monte Carlo simulations were carried out to determine the effect of deviating from the nominal syringe fill volume of 1 ml, an operator error that will again contribute to the overall calibration error budget. As can be seen in FIG. 5, under- or over-filling the syringe by 0.2 ml, a tolerance well within the capabilities of a skilled technician, leads to a change in chamber sensitivity of +0.16 and −0.4%, respectively, again practically independent of the isotope investigated. Maximum sensitivity occurs when the syringe is filled with approx. 0.7 ml, i.e. when the activity is distributed asymmetrically about the center of the chamber; a brief analysis of this behavior is discussed in the appendix.

Figure 6:
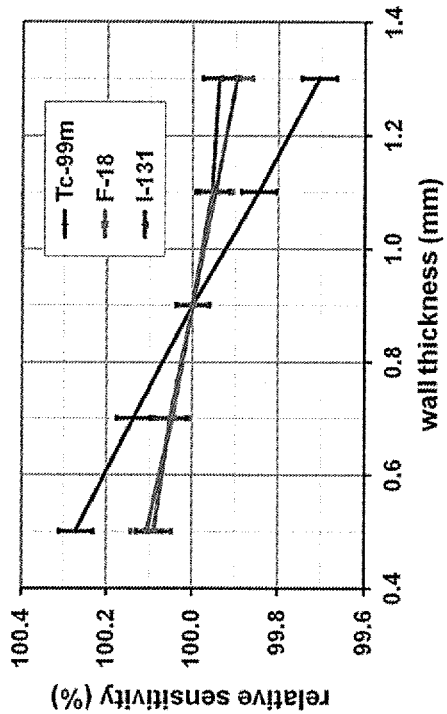
FIG. 6 shows a graph showing relative ion chamber sensitivity as a function of syringe wall thickness. Monte Carlo simulations for the isotopes $^{99m}$Tc, $^{18}$F and $^{131}$I.

Lastly, the change of sensitivity was evaluated as a function of syringe wall thickness (FIG. 6). The greatest change occurs for the isotope emitting the lowest energy photons ($^{99m}$Tc), as to be expected. $^{18}$F and $^{131}$I show similar trends within error bars. A change in wall thickness of 0.1 mm (>10% of nominal thickness) causes the chamber's sensitivity to vary by less than ±0.15%, even for $^{99m}$Tc, providing evidence of the relative insensitivity to such manufacturing variations. This variation would conceivably be greater for isotopes emitting photons of lower energy and will be quantified in future simulation studies.

Simulations and Measurements—Leakage Current

Leakage current was measured before each series of measurements by connecting the chamber to the electrometer but without radioisotope present. The value obtained was subtracted from the radioisotope measurements.

Leakage current was measured each time the ion chamber was used and ranged from 0.17 pA to 0.42 pA. Without restriction to a theory, this variation is likely to be due to the electrical connections of the ion chamber. Stability of the leakage current for any given series of measurements run was confirmed by measuring the leakage current before and after inserting radioisotopes into the ion chamber. Leakage current remained stable within 0.02 pA. Depending on the amount of radioisotope used, this uncertainty in leakage current resulted in a maximum of 0.4% uncertainty of the measurement current.

Simulations and Measurements—Stabilization

A series of consecutive one minute measurements were acquired after inserting the isotope into the chamber to determine when the chamber readings are repeatable.

Figure 7:
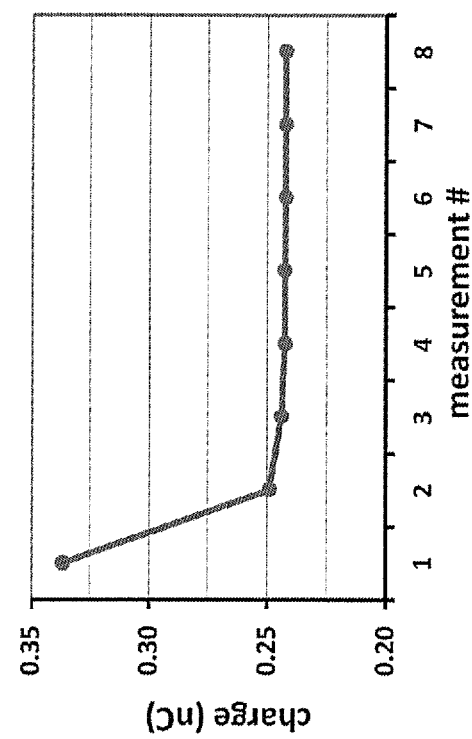
FIG. 7 shows a graph showing consecutive readings of charge collected by the ion chamber within one minute.

FIG. 7 shows a representative series of consecutive measurements, each acquired for 1 minute, leading to a stable reading after two to three data points have been acquired. Once stabilized, the measured values vary with a standard deviation of less than 0.1% of their mean.

Simulations and Measurements—Linearity

A sample of radioactive carbon ($^{11}$C, half life of 20 minutes, 10 GBq in 1 ml) was used to test the ion chamber's linearity with respect to the amount of activity present. While the C11 sample decayed over several hours, readings of one minute duration were taken every two minutes, using the electrometer's serial interface with automatic readout software (Dosicom v. 2.2, by PTW, Freiburg, Germany). The measured ionization current was then charted against activity.

Figure 8:
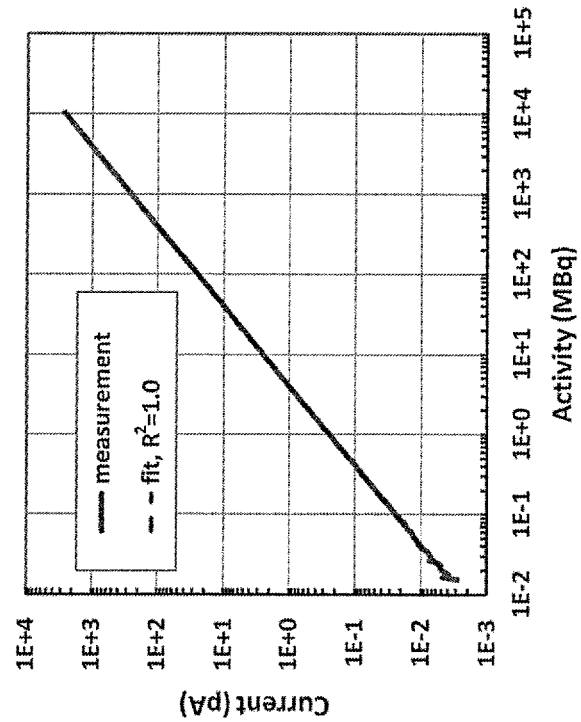
FIG. 8 shows a graph showing measurement of chamber response (pA) vs. activity for isotope $^{11}$C present in the chamber. The dashed red line is a fit to the curve for activities greater than 10 MBq.

The chamber's response was linear over almost 6 orders of magnitude (FIG. 8). A linear fit yielded a slope of 0.2546 pA/MBq with an intercept of −0.0004 pA and an $R^2$ value of 1.0. Noise increased notably towards lowest activity levels, owing to electrical and Poisson fluctuations and causing a maximum difference between fitted and measured data points of 28%. Above 1 MBq, the fit differed by less than 3% from the measurement.

Figure 9:
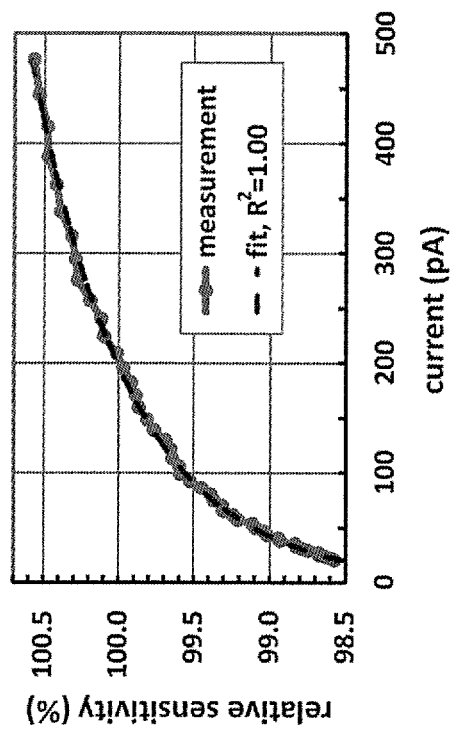
FIG. 9 shows a graph showing relative sensitivity for ion chamber currents I between 20 to 500 pA.

Closer inspection of the linearity data revealed that the ion chamber's sensitivity (pA/MBq) varied slightly over the measured activity range. FIG. 9 shows relative sensitivity of the chamber in the range between 20 . . . 500 pA, which corresponds to clinically measured activities of ≈270 . . . 6800 MBq of $^{99m}$Tc or 67 . . . 1700 MBq of $^{18}$F (Table 2). Within this range, the ion chamber's sensitivity rises by ≈2%. Knowing this dependency, a given measurement at location A can, for cross-calibration purposes, be transferred to location B by also reporting the current $I_A$ measured. Two options arise at location B in order to reduce the impact of the sensitivity change shown in FIG. 9 on the calibration result: either choose a quantity of radioisotope that produces a chamber current similar to the one measured at location A or consult FIG. 9 to appropriately scale the sensitivity measured at location A. An exponential fit to the measured data (dashed curve in FIG. 9) has been determined for this latter strategy:

$$\text{sensitivity (\%)} = (96.59 \cdot I \, [pA])^{0.00657} \quad (6)$$

The chart shown in FIG. 9 has arbitrarily been normalized to 100% at 200 pA. The dashed curve is an exponential fit to the measured data: sensitivity (%)=(96.59·I[pA])$^{0.00657}$.

Whatever the cause for the increasing sensitivity with ion chamber current, this dependence does not limit the application of the cross calibration method described here. To estimate the impact of this dependence on cross calibration accuracy, it is assumed that, rather than performing explicit corrections to the sensitivity determined at location A using equation (6), the operator at location B resorts to merely keeping the current $I_B$ within a factor 2 of the current $I_A$. Because the fitted curve rises with the power of 0.00657 (FIG. 9), this means that the readings at locations A and B deviate by less than 0.5%.

Simulations and Measurements—Long Term Stability (Constancy)

Over the span of 455 days, the chamber's response to the same $^{57}$Co point source (Eckhard and Ziegler, USM02), positioned in the center of its sensitive volume, was repeatedly measured and the obtained sensitivity plotted in order to ascertain the ion chamber's long term stability.

Figure 10:
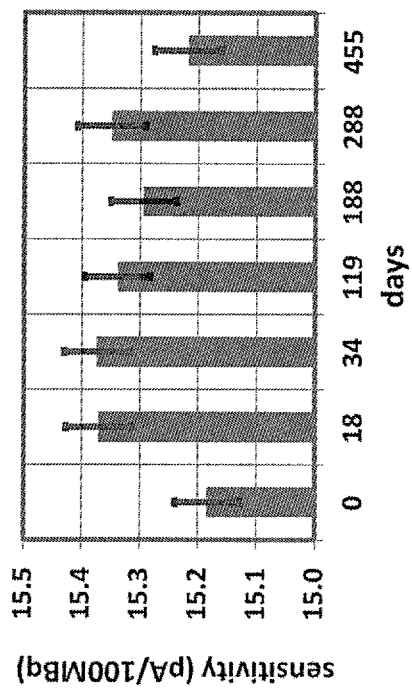
FIG. 10 shows long term stability is evaluated by repeated measurements (over 455 days) of the ion chamber's response to a point source of $^{57}$Co.

Over a time span of 455 days (FIG. 10), the chamber's sensitivity fluctuates with a standard deviation of 0.076 pA/100 MBq (coefficient of variation of 0.5%). All readings varied by less than 0.8% from their mean of 15.30 pA/100 MBq. The error bars in FIG. 10 result mostly from uncertainty in the pressure and temperature values (0.3% and 0.2%, respectively), with a minor contribution (<0.1%) from reproducibility (see section 3.C.). A sealed ion chamber, in which the quantity of gas inside the chamber is independent of ambient conditions, would significantly improve the measurement precision.

Total Uncertainty Budget

The various sources of error contributing to the cross calibration process described above are summarized in Table 3 and added in quadrature in the last row. Entries for which only maximum estimates of error were available (as opposed to standard deviation) were nonetheless added in quadrature, thus providing a conservatively high estimate of the overall uncertainty. The overall uncertainty in this analysis is found to be less than 1%.

TABLE 3

Summary of ion-chamber related uncertainties encountered

| Contributor to uncertainty | Relative uncertainty (%) | Comment |
| --- | --- | --- |
| Syringe insertion depth (length) | ±0.30 | ±5 mm from reference depth [a] |
| Syringe fill volume | +0.16 and −0.40 | ±0.2 ml from reference volume of 1 ml [a] |
| Syringe wall thickness | ±0.15 | for $^{99m}$Tc if thickness changes by ±0.1 mm |
| Leakage current | ±0.40 | maximum observed |
| Stabilization | ±0.10 | standard deviation |
| Linearity | ±0.50 | max. uncertainty for the case: $I_A/2 < I_B < 2I_A$ and 20 mA < $I_A$, $I_B$ < 500 mA |
| Constancy | ±0.50 | standard deviation |
| Total uncertainty | ±0.97 | |

[a] no significant dependence on isotope species

The variation of sensitivity with syringe fill volume is understood by using a simple analytical model of the chamber's response to a point source, $R_p$. Around its maximum, chamber sensitivity is approximated by a by a parabolic function:

$$R_p = 1 - \left(\frac{x - x_0}{x_r}\right)^2 \quad (7)$$

Where x is measured along the central axis of the chamber, $x_0$ marks the center of the chamber and $x_r$ is a reference distance used for scaling. Response R to a source extended along the central axis from $x_1$ to $x_2$ ($x_1 < x_0 < x_2$) of activity per unit length $A/(x_2-x_1)$ is then:

$$R = \int_{x_1}^{x_2} \frac{A}{x_2 - x_1} R_p dx = \quad (8)$$

$$A\left[1 - \frac{x_2^3 - x_1^3}{3(x_2 - x_1)x_r^2}\right] = \frac{A}{(x_r/x_1)^2}\left[\left(\frac{x_r}{x_1}\right)^2 - \frac{1}{3}\left(\frac{x_2}{x_1} - 1\right)^2 - \frac{x_2}{x_1}\right]$$

Where the origin of the x-axis has been placed in the chamber's center ($x_0=0$). Changing the fill volume means variation of ratio $x_2/x_1$ from the nominal value of −1 (keeping in mind that $x_1$ and $x_2$ have opposite sign because of $x_0=0$) to some other value. Differentiating equation (8) w.r.t. $x_2/x_1$ yields:

$$\frac{dR}{d(x_2/x_1)} = \frac{A}{(x_r/x_1)^2}\left(-\frac{2}{3}\left(\frac{x_2}{x_1} - 1\right) - 1\right) \quad (9)$$

The maximum response occurs when the first derivative is vanishes, i.e.:

$$-\frac{2}{3}\left(\frac{x_2}{x_1} - 1\right) - 1 = 0 \Leftrightarrow \frac{x_2}{x_1} = -\frac{1}{2} \quad (10)$$

This ratio of $x_2$ to $x_1$ is confirmed by the graphs in FIG. 5, which reach their maximum at a volume of approximately 0.75 ml. At the nominal fill volume of 1 ml, 0.5 ml are located above and below the chamber's center, respectively. A fill volume of 0.75 ml means that the upper 0.5 ml have been reduced to 0.25 ml, i.e. the plunger has reduced $x_2$ to $0.5x_1$, in accordance with equation (10).

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

The term "and/or" means any one of the items, any combination of the items, or all of the items with which this term is associated. The phrase "one or more" is readily understood by one of skill in the art, particularly when read in context of its usage.

As will be understood by the skilled artisan, all numbers, including those expressing quantities of reagents or ingredients, properties such as molecular weight, reaction conditions, and so forth, are approximations and are understood as being optionally modified in all instances by the term "about" These values can vary depending upon the desired properties sought to be obtained by those skilled in the art utilizing the teachings of the descriptions herein. It is also understood that such values inherently contain variability necessarily resulting from the standard deviations found in their respective testing measurements.

The term "about" can refer to a variation of ±5%, ±10%, ±200%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "computer" or "processor" or "computerized" system" describe examples of a suitably configured processing system adapted to implement one or more examples herein. Any suitably configured processing system is similarly able to be used by examples herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more examples of the present disclosure.

The term "portable electronic device" is intended to broadly cover many different types of electronic devices that are portable or that can be transported between locations by a user. For example, and not for any limitation, a portable electronic device can include any one or a combination of the following: a wireless communication device, a laptop personal computer, a notebook computer, a desktop computer, a personal computer, a smart phone, a Personal Digital Assistant, a tablet computer, gaming units, remote controller units, and other handheld electronic devices that can be carried on one's person.

The corresponding structures, materials, acts, and equivalents of all means or step plus function elements in the claims below are intended to include any structure, material, or act for performing the function in combination with other claimed elements as specifically claimed.

REFERENCES

The following references are incorporated herein by reference, where permitted, as if reproduced herein in their entirety.

[1] L. P. Clarke, R. J. Nordstrom, H. Zhang, P. Tandon, Y. Zhang, G. Redmond, K. Farahani, G. Kelloff, L. Henderson, L. Shankar, J. Deye, J. Capala and P. Jacobs, "The Quantitative Imaging Network: NCI's Historical Perspective and Planned Goals", Transl. Oncol. 7, 1-4 (2014)

[2] National Cancer Institute, "Quantitative Imaging for Evaluation of Responses to Cancer Therapies" http://imaging-.cancer.gov/programsandresources/SpecializedInitiatives/qin, last accessed on May 26, 2016

[3] H. Schrader, "Ionization chambers", Metrologia 44, S53-S66 (2007)

[4] American Association of Physics in Medicine, "The selection, use, calibration and quality assurance of radionuclide calibrators used in nuclear medicine", AAPM Report No. 181, Maryland, 2012

[5] IAEA Technical Report Series No. 454, "Quality Assurance for Radioactivity Measurement in Nuclear Medicine", published by the International Atomic Energy Agency (2006), ISBN: 92-0-105306-1

[6] R. Gadd, M. Baker, K. S. Nuran, S. Owens, W. Thomson, M. J. Woods and F. Zananiri: "UK National Physical Laboratory Measurement Good Practice Guide No. 93: Protocol for establishing and maintaining the calibration of medical radionuclide calibrators and their quality control" published by the National Physics Laboratory, Middlesex, United Kingdom, (2006), ISSN: 1368-6550

[7] P. Oropesa, M. J. Woods, V. Olšovcová, and J. A. dos Santos, "Radionuclide calibrator comparisons and quality improvement in nuclear medicine," Appl. Radiat. Isot. 66, 353-361 (2008).

[8] P. A. Oliveira and J. A. M. Santos "Innovative methodology for intercomparison of radionuclide calibrators using short half-life in situ prepared radioactive sources", Med. Phys. 41, 072507-1-8 (2014)

[9] K. Allberg "Simulated Dose Calibrator Source Standard for Positron Emission Tomography Radionuclides", patent publication number: US20090194677 A1 (2009)

[10] B. E. Zimmerman and J. T. Cessna "Development of a traceable calibration methodology for solid $^{68}$Ge/$^{68}$Ga sources used as a calibration surrogate for $^{18}$F in radionuclide activity calibrators", J. Nucl. Med. 51, 448-53 (2010)

[11] American Association of Physics in Medicine, "Addendum to the AAPM's TG-51 protocol for clinical reference dosimetry of high-energy photon beams", AAPM Report No. 51 addendum, Med. Phys. 41, 041501-1-20 (2014)

[12] F. Salvat, J. M. Fernández-Varea and J. Sempau "Penelope 2006: A Code System for Monte Carlo Simulation of Electron and Photon Transport", OECD workshop proceedings (2006), ISBN: 92-64-02301-1

The invention claimed is:

1. A method of cross-calibrating a radionuclide at two separate locations (A and B) comprising the steps of:
   (a) drawing up a known amount of activity, $A_{0A}$, at location A at calibration time $t_{0A}$ into a pre-defined volume in a first syringe;
   (b) inserting the syringe into a portable ion chamber, and placing the ion chamber into a dose calibrator;
   (c) measuring the chamber's response by integrating charge for a period of time $t_{iA}$ and determining a calibration factor;
   (d) transferring the ion chamber and the first syringe, emptied and cleaned, or an empty second syringe identical to the first syringe, to location B;
   (e) drawing a second sample having the same volume of the same radionuclide into the cleaned and emptied syringe or second syringe, placing the syringe into the ion chamber, placing the ion chamber into a second dose calibrator, and measuring the ion chamber's response in the second dose calibrator for a second period of time;
   (f) determining the activity of the second sample by adjusting with the location A calibration factor; and
   (g) cross-calibrating the second dose calibrator with the first dose calibrator using the measured activity of the second sample.

2. The method of claim 1 wherein the measured activity of the first sample is substantially constant during the time it takes to adjust the reading of the second calibrator at location B.

3. The method of claim 1 wherein the activity of the second sample is continuously displayed to provide a continuous decay-corrected activity value, after the second sample is removed from the dose calibrator.

4. The method of claim 1 wherein the ion chamber comprises an electrometer which is transferred with the ion chamber to location B.

5. The method of claim 1 wherein the first syringe is a 3 ml syringe, and the pre-defined volume is 1 ml.

6. The method of claim 1 which is computer-implemented using a processor to perform at least the calculation steps of the method.

7. The method of claim 6 wherein the processor is communicatively coupled with an electrometer and configured to display a continuously decay-corrected activity value once $A_{1B}$ is obtained and/or continuously displaying the sample's activity value, updated for radioactive decay of the sample, from the time the activity has first been measured, continuing on after the sample has been removed from the ion chamber and is inserted in to the dose calibrator.

8. The method of claim 7 wherein the processor is configured to obtain properly time-stamped readings, selecting half lives from a bank of stored radioisotopes, obtaining background readings and applying corrections, adjusting the measurement time $t_i$ as needed, storing calibration values obtained at location A (to be applied at location B), and/or accounting for residuals.

9. A system for cross-calibrating a radionuclide at two separate locations (A and B) comprising:
   (a) a portable ion chamber defining a cavity to receive a first syringe used to draw up a known amount of activity, $A_{0A}$, at location A at calibration time $t_{0A}$ into a pre-defined volume;
   (c) a first dose calibrator defining a cavity to receive the portable ion chamber and a second dose calibrator defining a cavity to receive the portable ion chamber;

(d) a processor configured to:
  (i) in the first dose calibrator at location A, measure the chamber's response for a first sample volume in the first syringe, by integrating charge for a period of time $t_{iA}$ and determining a calibration factor;
  (ii) measure the ion chamber's response in the second dose calibrator for a second period of time, after the ion chamber and the first syringe has been transferred to location B, and a second sample having the same volume of the same radionuclide into a cleaned and emptied first syringe or second identical syringe, placing the cleaned or second syringe into the ion chamber, placing the ion chamber into a second dose calibrator,
  (iii) determine the activity of the second sample by adjusting with the location A calibration factor; and
  (iv) cross-calibrate the second dose calibrator with the first dose calibrator using the measured activity of the second sample.

10. The system of claim 9 wherein the processor is communicatively coupled with an electrometer and configured to display a continuously decay-corrected activity value once $A_{1B}$ is obtained and/or continuously displaying the sample's activity value, updated for radioactive decay of the sample, from the time the activity has first been measured, continuing on after the sample has been removed from the ion chamber and is inserted in to the dose calibrator.

11. The system of claim 10 wherein the processor is configured to obtain properly time-stamped readings, selecting half lives from a bank of stored radioisotopes, obtaining background readings and applying corrections, adjusting the measurement time $t_i$ as needed, storing calibration values obtained at location A (to be applied at location B), and/or accounting for residuals.

* * * * *